United States Patent
Kim

(10) Patent No.: US 12,251,901 B2
(45) Date of Patent: Mar. 18, 2025

(54) MANUFACTURING METHOD OF WATERPROOF GLOVE

(71) Applicant: BNH INC CO., LTD., Seoul (KR)

(72) Inventor: Boung Wook Kim, Seoul (KR)

(73) Assignee: BNH INC CO., LTD., Seoul (KR)

( * ) Notice: Subject to any disclaimer, the term of this patent is extended or adjusted under 35 U.S.C. 154(b) by 156 days.

(21) Appl. No.: 18/109,159

(22) Filed: Feb. 13, 2023

(65) Prior Publication Data
US 2024/0269950 A1 Aug. 15, 2024

(51) Int. Cl.
| | |
|---|---|
| *B29D 99/00* | (2010.01) |
| *A41D 19/00* | (2006.01) |
| *A41D 31/02* | (2019.01) |
| *A41D 31/102* | (2019.01) |
| *B32B 5/02* | (2006.01) |
| *B32B 27/12* | (2006.01) |
| *B32B 27/40* | (2006.01) |
| *B32B 37/12* | (2006.01) |

(52) U.S. Cl.
CPC ..... *B29D 99/0067* (2013.01); *A41D 19/0006* (2013.01); *A41D 31/02* (2013.01); *A41D 31/102* (2019.02); *B32B 5/022* (2013.01); *B32B 27/12* (2013.01); *B32B 27/40* (2013.01); *B32B 37/1207* (2013.01); *B32B 2037/1215* (2013.01); *B32B 2262/0292* (2013.01); *B32B 2307/7265* (2013.01); *B32B 2437/02* (2013.01)

(58) Field of Classification Search
CPC ............ A41D 19/0006; A41D 19/0068; A41D 31/02; A41D 31/102; B32B 2037/1215; B32B 2262/0292; B32B 2307/7265; B32B 2437/02; B32B 27/12; B32B 27/40; B32B 37/1207; B32B 5/022; B29D 99/0067
See application file for complete search history.

(56) References Cited

U.S. PATENT DOCUMENTS

2017/0135424 A1* 5/2017 Kim ..................... A41D 31/125

FOREIGN PATENT DOCUMENTS

| JP | 2016-052721 A | 4/2016 |
|---|---|---|
| KR | 10-1454001 B1 | 10/2014 |

(Continued)

OTHER PUBLICATIONS

Description of JP2016052721.*

(Continued)

*Primary Examiner* — Sonya M Sengupta
(74) *Attorney, Agent, or Firm* — Heedong Chae; Lucem, PC

(57) ABSTRACT

The present disclosure relates to a manufacturing method of a waterproof glove. In more detail, the manufacturing method of a waterproof glove includes: a membrane glove manufacturing step of manufacturing a glove using a polyurethane membrane sheet applied with a hot-melt adhesive; a lining glove inserting step of inserting a lining glove into the membrane glove manufactured to the membrane glove manufacturing step; a membrane glove inserting step of inserting the membrane glove with the lining glove inserted through the lining glove inserting step into an outshell glove; and a thermal bonding step of bonding the lining glove, the membrane glove, and the outshell glove by heating the outshell glove with the membrane glove inserted through the membrane glove inserting step.

3 Claims, 5 Drawing Sheets

(56) References Cited

FOREIGN PATENT DOCUMENTS

KR     10-2016-0005526 A     1/2016
KR     10-2020-0144631 A     12/2020

OTHER PUBLICATIONS

Description of KR101454001.*
Description of KR20200144631.*
Description of KR20160005526A.*
Description of KR2411244B1.*

* cited by examiner

MANUFACTURING METHOD OF WATERPROOF GLOVE

BACKGROUND OF THE INVENTION

Field of the Invention

The present disclosure relates to a manufacturing method of a waterproof glove and, more particularly, to a manufacturing method of a waterproof glove that has excellent wearing comfort because a membrane sheet applied with a hot-melt adhesive is applied, that shows excellent waterproofness and humidity discharge performance because a lining and an outshell are in close contact with each other, of which the lining or the outshell is not separated when the glove is taken off, and of which the manufacturing time and manufacturing cost are low because the manufacturing process is simplified.

Description of the Related Art

In general, gloves are usually used for working, cold weather, leisure, sports, etc. Gloves for working are usually used to prevent hands from being injured by protecting hands from external shock, etc. and gloves for cold weather are used to protect hands from external chillness.

Further, gloves used for sports or leisure are worn to prevent factors that decrease efficiency of sports such as external shock to hands or slip of hands. In particular, as for sports that require equipment such as baseball, golf, and tennis, gloves may be considered as necessities to absorb external shock, prevent slip, or hold equipment well.

Such gloves of the related art are generally made of leather such as natural leather or synthetic leather, cotton, rubber, or the like, and the effect of protecting hands by absorbing external shock can be expected simply from the shapes when they are worn. However, there is a problem that when the gloves are worn for a long time, ventilation with the outside is not made well, so wearing comfort is deteriorated due to accumulation of moisture such as sweat on the hands of a wearer or humidity, and they are not good in terms of sanitation, for example, skin diseases such as moist tetter on the palms are caused due to generation and accumulation of moisture such as sweat for a long time.

Further, outdoor gloves require waterproofness, but outdoor gloves of the related art cause those problems because the materials that are applied to give waterproofness do not have breathability. Further, there is a problem that since a space exists between the inner cover and the outer cover, even if the inner cover has waterproofness, the waterproofness is deteriorated due to moisture remaining in the space.

PRIOR ART DOCUMENT

Patent Document (Patent Document 1) Korean Patent No. 10-1683092 (2016 Nov. 30)
(Patent Document 2) Korean Patent No. 10-2186366 (2020 Nov. 27)

SUMMARY OF THE INVENTION

An objective of the present disclosure is to provide a manufacturing method of a waterproof glove that has excellent wearing comfort because a membrane sheet applied with a hot-melt adhesive is applied, that shows excellent waterproofness and humidity discharge performance because a lining and an outshell are in close contact with each other, of which the lining or the outshell is not separated when the glove is taken off, and of which the manufacturing time and manufacturing cost are low because the manufacturing process is simplified.

An objective of the present disclosure is achieved by providing a manufacturing method of a waterproof glove that includes: a membrane glove manufacturing step of manufacturing a glove using a polyurethane membrane sheet applied with a hot-melt adhesive; a lining glove inserting step of inserting a lining glove into the membrane glove manufactured to the membrane glove manufacturing step; a membrane glove inserting step of inserting the membrane glove with the lining glove inserted through the lining glove inserting step into an outshell glove; and a thermal bonding step of bonding the lining glove, the membrane glove, and the outshell glove by heating the outshell glove with the membrane glove inserted through the membrane glove inserting step.

According to a preferred characteristic of the present disclosure, the membrane glove manufacturing step is performed by applying a hot-melt adhesive to both sides of a polyurethane membrane sheet, stacking two polyurethane membrane sheets applied with a hot-melt adhesive and then cutting the sheets into a hand shape, and thermally bonding the edge of the stack of cut membrane sheets except for the portion in which the lining glove is inserted.

According to a more preferred characteristic of the present disclosure, the polyurethane membrane sheet is manufactured by performing electrospinning on a polyurethane solution, the polyurethane solution is produced by mixing and heating polyurethane of 10 to 15 part by weight with a solvent of 100 part by weight, and the solvent is produced by mixing N, N-dimethylformamide and tetrahydrofuran at 1:1 part by weight.

According to a preferred characteristic of the present disclosure, the hot-melt adhesive is applied in a dot type.

According to a preferred characteristic of the present disclosure, the hot-melt adhesive is composed of olefin-based resin of 100 part by weight including a propylene repeat unit having a melting point of 70 to 120° C., hydrogenated styrene-based block copolymer of 50 to 400 part by weight, and hydrocarbon-based adhesive resin of 400 to 800 part by weight.

According to a preferred characteristic of the present disclosure, the hydrogenated styrene-based block copolymer is composed of one or more selected from a group of a styrene-ethylene-butylene-styrene block copolymer, a styrene-ethylene-propylene-styrene block copolymer, a styrene-ethylene-propylene block copolymer, a styrene-ethylene-ethylene-propylene-styrene block copolymer, and a styrene-butylene-butadiene-styrene block copolymer.

According to a preferred characteristic of the present disclosure, the thermal bonding step is performed by putting the outshell glove with the membrane glove inserted through the membrane glove inserting step on a hand-shaped mold, and then heating the mold at temperature of 110 to 130° C.

Accordingly, the manufacturing method of a waterproof glove according to the present disclosure shows a remarkable effect of providing a waterproof glove that has excellent wearing comfort because a membrane sheet applied with a hot-melt adhesive is applied, that shows excellent waterproofness and humidity discharge performance because a lining and an outshell are in close contact with each other, of which the lining or the outshell is not separated when the glove is taken off, and of which the manufacturing time and manufacturing cost are low because the manufacturing process is simplified.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Figure 1:
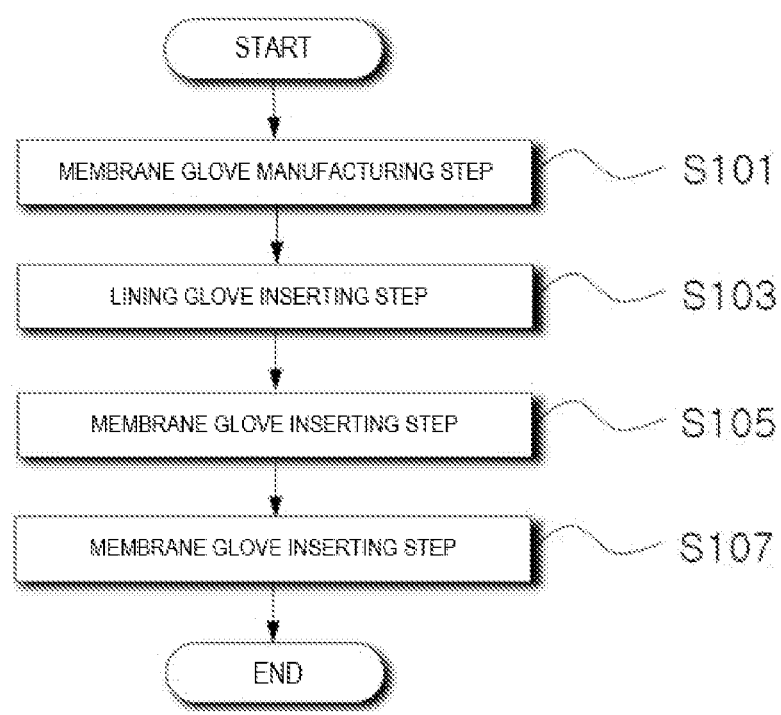
FIG. 1 is a flowchart showing a manufacturing method of a waterproof glove according to the present disclosure.
Figure 2:
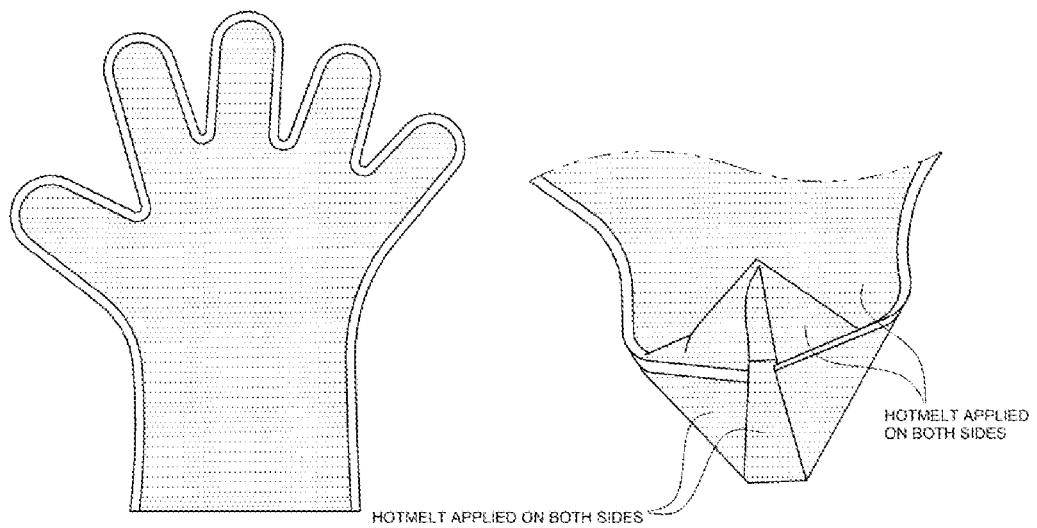
FIG. 2 is a picture of a membrane glove applied with a hot-melt adhesive that is used in the present disclosure.
Figure 3:
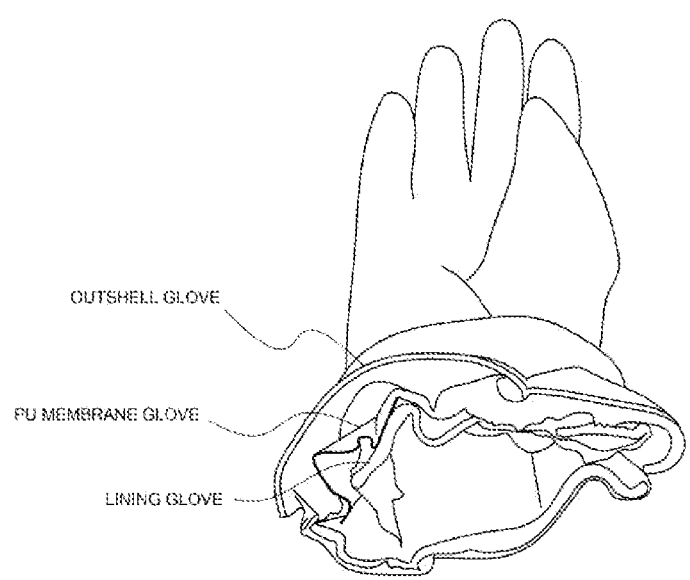
FIG. 3 is a picture showing a cross-section of a glove manufactured by the manufacturing method of a glove according to the present disclosure.

Hereafter, a preferable embodiment of the present disclosure and properties of constituents are described in detail, but this is for describing in detail the present disclosure such that those skilled in the art can easily achieve the present disclosure without limiting the spirit and scope of the present disclosure.

A manufacturing method of a waterproof groove according to the present disclosure includes: a membrane glove manufacturing step (S101) of manufacturing a glove using a polyurethane membrane sheet applied with a hot-melt adhesive; a lining glove inserting step (S103) of inserting a lining glove into the membrane glove manufactured to the membrane glove manufacturing step (S101); a membrane glove inserting step (S105) of inserting the membrane glove with the lining glove inserted through the lining glove inserting step (S103) into an outshell glove; and a thermal bonding step (S107) of bonding the lining glove, the membrane glove, and the outshell glove by heating the outshell glove with the membrane glove inserted through the membrane glove inserting step (S105).

The membrane glove manufacturing step (S101), which is a step of manufacturing a glove using a polyurethane membrane sheet applied with a hot-melt adhesive, is composed of processes of applying a hot-melt adhesive to both sides of a polyurethane membrane sheet, stacking two polyurethane membrane sheets applied with a hot-melt adhesive and then cutting the sheets into a hand shape, and thermally bonding the edge of the stack of cut membrane sheets except for the portion in which the lining glove is inserted.

In this case, it is preferable that the hot-meld adhesive is applied in a dot type rather than being applied throughout both sides of the polyurethane membrane sheet. When the hot-meld adhesive is applied in a dot type, mobility is secured between the outshell and the lining, so it is possible to provide a waterproof glove showing soft wearing comfort.

Further, it is preferable that the polyurethane membrane sheet is manufactured by performing electrospinning on a polyurethane solution, the polyurethane solution is produced by mixing and heating polyurethane of 10 to 15 part by weight with a solvent of 100 part by weight, and the solvent is produced by mixing N, N-dimethylformamide and tetrahydrofuran at 1:1 part by weight.

The polyurethane membrane sheet composed of these constituents not only shows excellent elasticity and waterproof performance, but passes air, thereby not only providing soft wearing comfort and waterproof performance, but suppressing production of moisture in the waterproof glove.

Further, the hot-melt adhesive is composed of olefin-based resin of 100 part by weight including a propylene repeat unit having a melting point of 70 to 120° C., hydrogenated styrene-based block copolymer of 50 to 400 part by weight, and hydrocarbon-based adhesive resin of 400 to 800 part by weight.

The olefin-based resin may be any one selected from a polypropylene homopolymer and an ethylene-propylene copolymer, or a compound thereof. The polypropylene homopolymer, preferably, may be polypropylene (Metallocene polypropylene, m-PP) produced under metallocene solvent.

Further, the olefin-based resin, in detail, may be elastic polypropylene-based resin including a propylene repeat unit in a polymer main chain, and preferably, the elastic polypropylene-based resin may be elastic ethylene-propylene random copolymer, but is not limited thereto.

Further, the weight average molecular weight of the olefin-based resin, though not limited thereto, may be 10,000 to 1,000,000 g/mol, in detail, 20,000 to 500,000 g/mol, and in more detail, 50,000 to 300,000 g/mol.

The density of the olefin-based resin may be, at 25° C., 0.92 g/cm$^3$ or less, preferably 0.91 g/cm$^3$ or less, and more preferably 0.905 g/cm$^3$ or less. The lower limit of the olefin-based resin may be 0.80 g/cm$^3$ or more.

Further, it is preferable that the hydrogenated styrene-based block copolymer is composed of one or more selected from a group of a styrene-ethylene-butylene-styrene block copolymer, a styrene-ethylene-propylene-styrene block copolymer, a styrene-ethylene-propylene block copolymer, a styrene-ethylene-ethylene-propylene-styrene block copolymer, and a styrene-butylene-butadiene-styrene block copolymer.

Further, it may be preferable that the hydrocarbon-based adhesive resin is obtained by hydrogenating hydrocarbon-based resin including a styrene-based monomer and a polycyclic aromatic monomer as repeat units. As a detailed example, the styrene-based monomer may be styrene or methyl styrene and the polycyclic aromatic monomer may be indene. For example, hydrogenated hydrocarbon-based resin obtained by hydrogenating methyl styrene and indene copolymer resin is preferable.

The hot-melt adhesive composed of those constituents has not only excellent adhesion and excellent resistance against water, thereby suppressing separation between the outshell or the lining and the polyurethane membrane glove due to deterioration of adhesive when it is exposed to water.

Further, the softening point of the hot-melt adhesive composite is 110 to 130° C. Since the hot-melt adhesive used in the present disclosure has a softening point in this range, as compared with that the softening point of hot-melt adhesive composites used in the related art is high as 150 to 250° C., a bonding process can be performed by melting the hot-melt adhesive at a relatively low temperature, so it is possible to prevent damage to the outshell or the lining and the polyurethane membrane glove.

Further, the hot-melt adhesive may further contain one or more of selected from a group of well-known lubricant, wax, plasticizer, and antioxidant.

The lubricant may be paraffin-based oil or naphthene-based oil. The lubricant may be included by 1 to 30 percent by weight, preferably, 10 to 30 percent by weight for the total weight of the hot-melt adhesive.

The wax may be paraffin wax. The wax may be included by 1 to 10 percent by weight, preferably, 2 to 8 percent by weight for the total weight of the hot-melt adhesive composite.

Further, the plasticizer may be glycerin, glycerin diacetate, pentaerythritol, sorbitol, and ethylene glycol and may be included by 1 to 10 percent by weight for the total weight of the hot-melt adhesive composite.

Further, the antioxidant may be thioester, phosphate, aromatic amine, hindered phenol, tetrakis(methylene-3-(3', 5'-di-t-butyl-4'-hydroxyphenyl) propionate) methane, 2,2'-ethylidenebis (4,6-di-tert-butyl phenol), 1,1-tris(2-methyl-4-hydroxy-t-butyl phenyl) butane, 1,3,5-trimethyl-2,4,6-tris(3, 5-tert-butyl-4-hydroxybenzyl)benzene, dilauryl thiodipropionate, pentaerythritol tetrakis(β-lauryl thiodipropionate) polyphosphate, and thiophosphite, and may be included by 1 to 5 percent by weight for the total weight of the hot-melt adhesive composite.

The lining glove inserting step (S103) is a step of inserting a lining glove into the polyurethane membrane glove manufactured through the membrane glove manufacturing step (S101), in which the material of the lining glove is not specifically limited and may be made of any material as long as it is a component that can be bonded to the polyurethane membrane glove by the hot-melt adhesive, but it is preferable the lining glove may have a smaller internal space than the polyurethane membrane glove to be able to seated in the polyurethane membrane glove manufactured through the membrane glove manufacturing step.

The membrane glove inserting step (S105) is a step of inserting the membrane glove with the lining glove inserted therein through the lining glove inserting step (S103) into the outshell glove, in which the material of the outshell glove is not specifically limited and may be made of any material as long as it is a component that can be bonded to the polyurethane membrane glove by the hot-melt adhesive, but it is preferable the lining glove may have a larger internal space than the polyurethane membrane glove such that the polyurethane membrane glove manufactured through the membrane glove manufacturing step can be seated therein.

Figure 4:
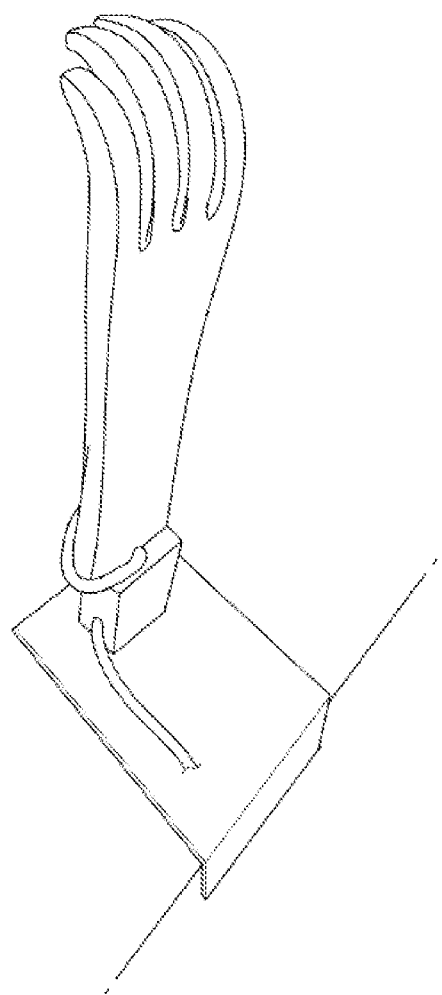
FIG. 4 is a perspective view showing a hand-shaped mold that is used in the present disclosure.
Figure 5:
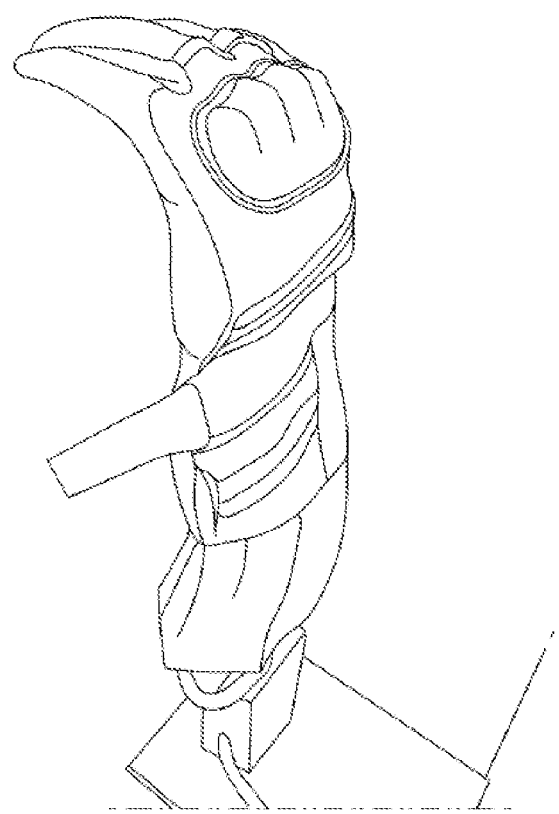
FIG. 5 is a perspective view showing a process in which a waterproof glove is heated in a hand-shaped mold that is used in the present disclosure.

The thermal bonding step (S107) is a step of bonding the lining glove, the membrane glove, and the outshell glove by heating the outshell glove with the membrane glove inserted through the membrane glove inserting step (S105), and is composed of processes of putting the outshell glove with the membrane glove inserted through the membrane glove inserting step (S105) on a hand-shaped mold, as shown in FIGS. 4 and 5, heating the mold at temperature of 110 to 130° C. for 5 to 10 minutes, and then cooling it to the room temperature.

When the glove is heated at temperature of 110 to 130° C. through this process, the hot-melt adhesive applied in a dot type on both sides of the membrane glove is melted, thereby binding the outshell glove and the lining glove.

Hereafter, the manufacturing method of a waterproof groove according to the present disclosure and the properties of a waterproof glove manufactured by the manufacturing method are described with reference to embodiments.

<Manufacturing Example 1> Manufacturing of Hot-Melt Adhesive

A hot-melt adhesive was manufactured by mixing olefin-(metallocene polypropylene) including a based resin propylene repeat unit having a melting point of 95° C. of 100 part by weight, hydrogenated styrene-based block copolymer (styrene-ethylene-butylene-styrene block copolymer) of 250 part by weight, and hydrocarbon-based adhesive resin (methyl styrene and indene copolymer resin) of 600 part by eight.

<Manufacturing Example 2> Manufacturing of Polyurethane Membrane Sheet

A membrane sheet having a thickness of 20 μm was manufactured by manufacturing a polyurethane solution by mixing and heating polyurethane of 12.5 part by weight to a solvent (N, N-dimethylformamide and tetrahydrofuran at 1:1 part by weight) of 100 part by weight, and then performing electrospinning on the manufactured polyurethane solution.

<Manufacturing Example 3> Manufacturing of Polyurethane Membrane Glove

A polyurethane membrane glove was manufactured by coating the hot-melt adhesive manufactured through the manufacturing example 1 on both sides of the polyurethane membrane sheet manufactured to the manufacturing example 2 in a dot type, stacking and cutting two polyurethane membrane sheets applied with the hot-melt adhesive in a hand shape, and then thermally bonding the edge of the stack of cut membrane sheets except for the portion in which the lining glove is inserted.

<Manufacturing Example 4> Manufacturing of Polyurethane Membrane Glove

A polyurethane membrane glove was manufactured by performing the process of the manufacturing example 3 and coating the hot-melt adhesive manufactured through the manufacturing example 1 on the front surface of the polyurethane membrane sheet manufactured to the manufacturing example 2.

Manufacturing Example 5

A polyurethane membrane glove was manufactured by stacking and then cutting two polyurethane membrane sheets manufactured to the manufacturing example 2 and then thermally bonding the edge of the stack of cut membrane sheets except for the portion in which the lining glove is inserted.

Embodiment 1

A waterproof glove was manufactured by inserting a lining glove made of polyurethane inside the polyurethane membrane glove manufactured through the manufacturing example 3, inserting the polyurethane membrane glove with the lining glove inserted therein into an outshell glove made of polyurethane, putting the outshell glove, in which the polyurethane membrane glove with the lining glove inserted therein is inserted, on a hand-shaped mold, heating the hand-shaped mold at 120° C. for 8 minutes, separating the glove from the mold, and the cooling the mold to the room temperature.

Comparative Example 1

A waterproof glove was manufactured by performing the process of the embodiment 1 and using the polyurethane membrane glove manufactured through the manufacturing example 4.

Comparative Example 2

A waterproof glove was manufactured by inserting a lining glove made of polyurethane inside the polyurethane membrane glove manufactured through the manufacturing example 5, and then inserting the polyurethane membrane glove with the lining glove inserted therein into an outshell glove.

Waterproof performance, separation strength, and flexibility of the waterproof gloves manufactured through the embodiment 1 and comparative examples 1 and 2 were manufactured and shown in the following Table 1.

{However, a method of checking whether water permeates into the gloves manufactured through the embodiment 1 and comparative examples 1 and 2 after immersing the gloves in water for 1 minutes under the condition that water does not permeate into the portion in which a hand is inserted was used, separation strength was manufactured at 25° C. using a tensile strength tester, the tensile strength between the polyurethane membrane gloves and the outshell gloves was measured, and separation strength was measured 10 times by pulling the polyurethane membrane gloves at a speed of 300 mm/min with the outshell glove fixed to a jig at a side of the tensile strength tester and was shown as an average value.

Further, the degrees of flexibility were observed out of 10 after 50 examinees wore the gloves and repeated folding/unfolding fingers, and were shown as an average value, in which 0~3 points were shown by x, 4~7 points were shown by Δ, and 8~10 points were shown by o.

TABLE 1

| Items | Waterproofness | Separation strength (g/25 mm) | Flexibility |
|---|---|---|---|
| Embodiment 1 | o | 173 | o |
| Comparative example 1 | o | 201 | Δ |
| Comparative example 2 | o | — | o |

As shown in Table 1, the waterproofness and separation strength of the waterproof glove manufactured through the embodiment 1 of the present disclosure were excellent and the flexibility was also excellent. However, as for the glove manufactured through the comparative example 1, waterproofness was secured because water did not permeate into the lining glove in the waterproofness test process, but there was a problem that a space existed between the outshell glove and the polyurethane membrane glove, so water permeated into the space.

Accordingly, the manufacturing method of a waterproof glove according to the present disclosure provides a waterproof glove that has excellent fit because a membrane sheet applied with a hot melt adhesive is applied, that shows excellent waterproofness and humidity discharge performance because a lining and an outshell are in close contact with each other, of which the lining or the outshell is not separated when the glove is taken off, and of which the manufacturing time and manufacturing cost are low because the manufacturing process is simplified.

What is claimed is:

1. A manufacturing method of a waterproof glove, the manufacturing method comprising:
    a membrane glove manufacturing step of manufacturing a glove using a polyurethane membrane sheet applied with a hot-melt adhesive;
    a lining glove inserting step of inserting a lining glove into the membrane glove manufactured to the membrane glove manufacturing step;
    a membrane glove inserting step of inserting the membrane glove with the lining glove inserted through the lining glove inserting step into an outshell glove; and
    a thermal bonding step of bonding the lining glove, the membrane glove, and the outshell glove by heating the outshell glove with the membrane glove inserted through the membrane glove inserting step,
    wherein the hot-melt adhesive is applied in a dot type and is composed of olefin-based resin of 100 part by weight including a propylene repeat unit having a melting point of 70 to 120° C., hydrogenated styrene-based block copolymer of 50 to 400 part by weight, and hydrocarbon-based adhesive resin of 400 to 800 part by weight,
    the membrane glove manufacturing step is performed by applying a hot-melt adhesive to both sides of a polyurethane membrane sheet, stacking two polyurethane membrane sheets applied with a hot-melt adhesive and then cutting the sheets into a hand shape, and thermally bonding the edge of the stack of cut membrane sheets except for the portion in which the lining glove is inserted,
    the thermal bonding step is performed by putting the outshell glove with the membrane glove inserted through the membrane glove inserting step on a hand-shaped mold, and then heating the mold at temperature of 110 to 130° C.

2. The manufacturing method of claim 1, wherein the polyurethane membrane sheet is manufactured by performing electrospinning on a polyurethane solution,
    the polyurethane solution is produced by mixing and heating polyurethane of 10 to 15 part by weight with a solvent of 100 part by weight, and
    the solvent is produced by mixing N, N-dimethylformamide and tetrahydrofuran at 1:1 part by weight.

3. The manufacturing method of claim 1, wherein the hydrogenated styrene-based block copolymer is composed of one or more selected from a group of a styrene-ethylene-butylene-styrene block copolymer, a styrene-ethylene-propylene-styrene block copolymer, a styrene-ethylene-propylene block copolymer, a styrene-ethylene-ethylene-propylene-styrene block copolymer, and a styrene-butylene-butadiene-styrene block copolymer.

* * * * *